United States Patent [19]

Swartz et al.

[11] Patent Number: 4,920,797

[45] Date of Patent: May 1, 1990

[54] FLUID LEVEL SENSOR

[75] Inventors: Harold L. Swartz; Warren W. Stansberry, both of Phoenix, Ariz.

[73] Assignee: Schaevitz Sensing Systems, Inc., Phoenix, Ariz.

[21] Appl. No.: 301,964

[22] Filed: Jan. 9, 1989

[51] Int. Cl.⁵ .................... G01B 21/18; G01F 23/62
[52] U.S. Cl. .............................. 73/309; 73/313; 324/251
[58] Field of Search ............... 73/309, 308, 322; 361/181; 324/207

[56] References Cited

U.S. PATENT DOCUMENTS

| | | | |
|---|---|---|---|
| 1,613,418 | 1/1927 | Uebelmesser | 73/309 |
| 1,723,173 | 8/1929 | Huggins | 73/309 |
| 2,434,425 | 1/1948 | Muller | 73/309 |
| 3,234,792 | 2/1966 | Ririe et al. | 73/309 X |
| 3,710,613 | 1/1973 | Innes et al. | 73/DIG. 5 X |
| 3,992,941 | 11/1976 | McGoldrick | 340/623 X |
| 4,466,284 | 8/1984 | Dumery | 73/313 |
| 4,793,241 | 12/1988 | Mano et al. | 324/208 X |

Primary Examiner—Daniel M. Yasich
Attorney, Agent, or Firm—Nixon & Vanderhye

[57] ABSTRACT

Disclosed is a fluid level sensor including a float mounted for movement in a mounting tube by a pair of spiral springs which are relatively rigid in a radial direction but relatively flexible in a longitudinal direction. At the top of the float a magnet is located and at the top of the mounting tube, a Hall effect device is located. As fluid enters the mounting tube through apertures in the lower portion, the float is gradually buoyed and moves closer to the Hall effect device changing its electrical output. Because the springs position the float inside the mounting tube, striction and hysteresis in conventional float supports is eliminated as well as wear between the float and the outer tube. Measurement range may be changed by changing float length and outer tube length as well as the spring constants themselves.

17 Claims, 2 Drawing Sheets

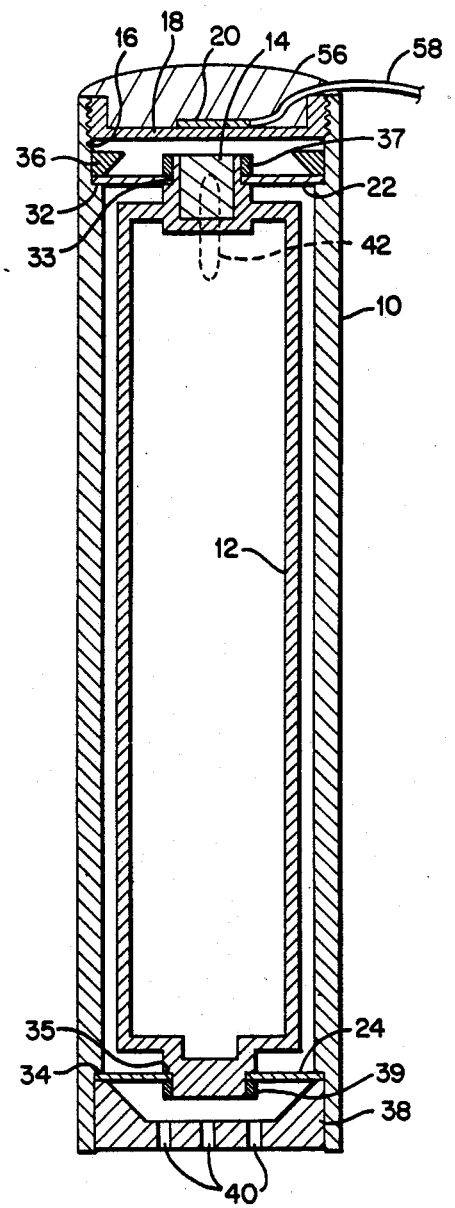
FIG. 1
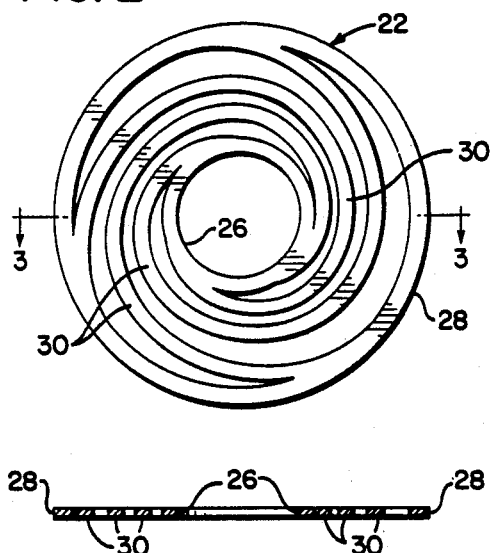
FIG. 2
FIG. 3
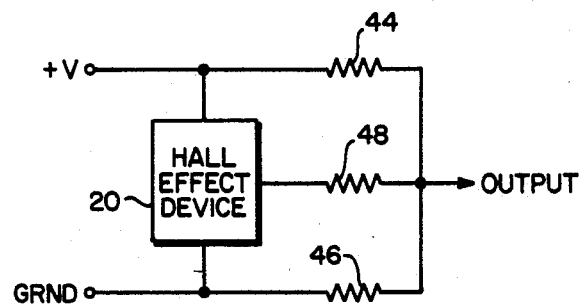
FIG. 4
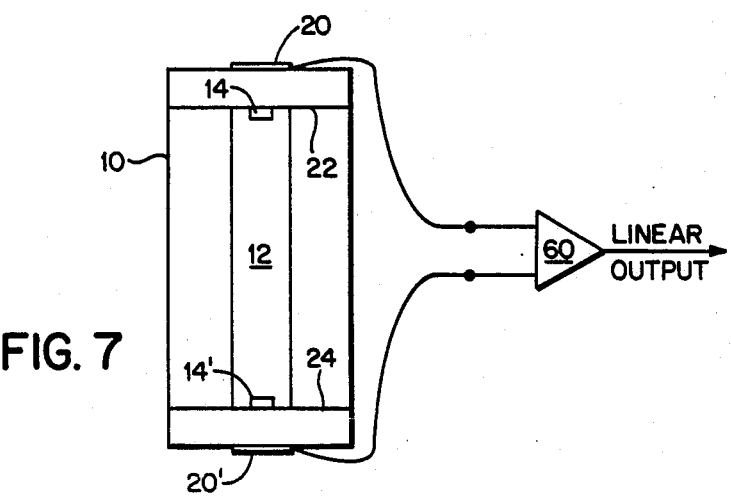
FIG. 7

FIG. 6
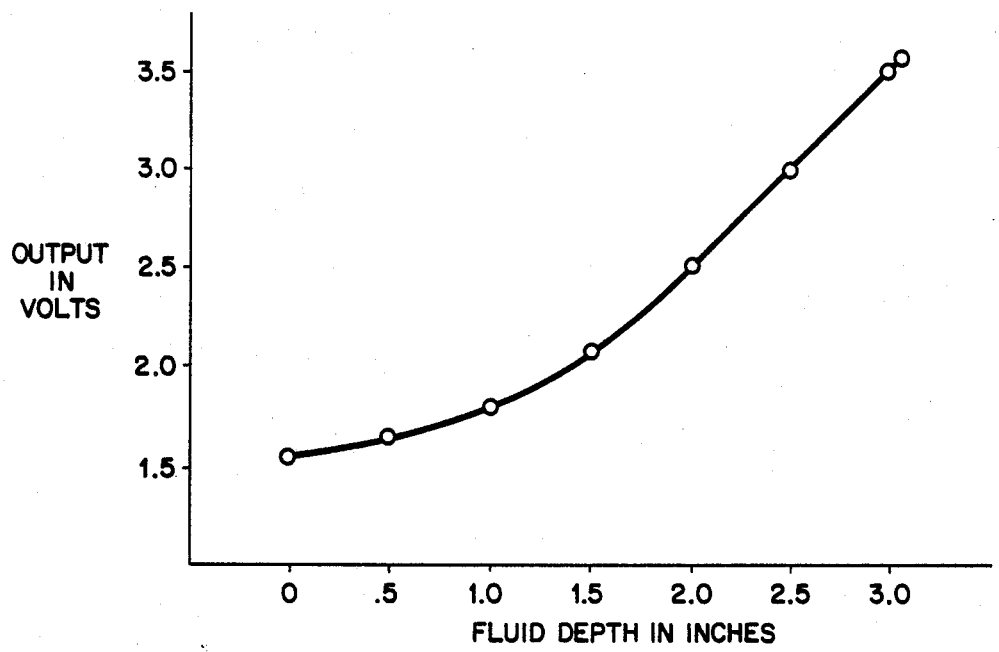
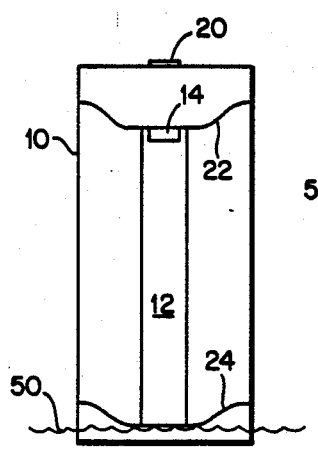
FIG. 5A
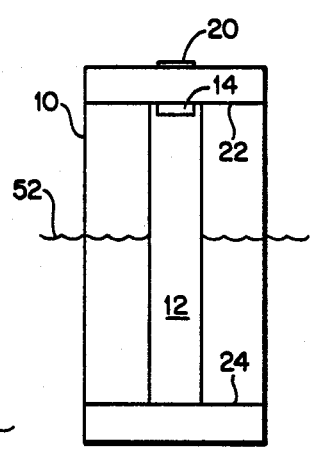
FIG. 5B
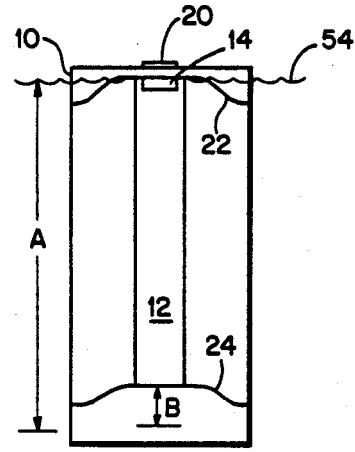
FIG. 5C

FLUID LEVEL SENSOR

BACKGROUND OF THE INVENTION

1. Field of the Invention

The present invention relates generally to an apparatus for measuring fluid level and specifically to an apparatus for measuring fluid levels in hazardous environmental conditions.

2. Discussion of the prior art

Previous fluid sensing devices comprise a float generally mounted on the end of a lever arm whereby the float moves with the changing fluid level and the arm is connected to a potentiometer for providing a variable electrical output as the float moved along with the fluid level. However, such devices are not generally advantageous to use in a hazardous environment, for example, as a gasoline or diesel fluid level sensor. There is a possibility that there could be a small degree of arcing in the potentiometer or that a failure in the potentiometer itself could cause a spark igniting the fuel air mixture in the tank resulting in a possible explosion and fire.

In an attempt to avoid such difficulties, more recent fluid level sensing devices have utilized a float having a magnet mounted thereon located so as to move past a Hall effect device which provides an electrical indication when the fluid level is such that the magnet activates the Hall effect device.

Such systems had disadvantages in that in order to position the magnet relatively close to the Hall effect device, it is necessary to constrain movement of the float in a casing with the result that the float occasionally becomes jammed in the casing and fails to provide an accurate indication of the fluid level. If the clearances are made small enough so that jamming does not occur, then particles in the fluid or other debris can serve to jam the float inside the casing. Furthermore, in order to provide more than merely a single float level indication (the fuel level is less than or greater than the position marked by the Hall effect device) it is necessary to provide a plurality of Hall effect devices which essentially provide a digital fluid level readout.

In some instances the float may be mounted for pivotal movement rather than free floating in the measuring container. Whichever manner of mounting the float, it is always subject to a certain amount of sticking friction (stiction) and hysteresis in the pivot arm. This affects the accuracy of the device and requires that it normally be large enough so that the float moves through the full range of fluid level in order to provide an accurate output of the fuel level sensor. Furthermore, in order to change the measurement range, it is generally necessary to change the length of travel of the float so as to provide a measurement output over the desired increased length. This generally requires a redesign lengthening the pivot arm or the container constraining the float (in the case of a free floating fluid level sensor) which are major design changes.

Further, the digital output device requires multiple Hall effect devices and a suitable electronic circuit for scanning in some sequential fashion the individual Hall effect devices to determine the position of the float mounted magnet. Generally the magnet is located along the side of the float so that it passes adjacent the vertically oriented series of Hall devices. Such a magnet mounting allows for contamination of the magnet and the Hall devices by ferrous particles contained in the fluid flowing around the float.

SUMMARY OF THE INVENTION

It is an object of the present invention to provide a fluid level sensor in which stiction and hysteresis of the float and float support is eliminated.

It is a further object of the present invention to provide a fluid level sensor in which wear of the float and outer tube are eliminated.

It is a still further object of the present invention to provide a fluid level sensor that is resistant to jamming by debris in the fluid.

It is an additional object of the present invention to provide an analog electrical output indicative of fluid level by means of a single Hall effect device.

It is a still further object of the present invention to prevent fluid in a fluid level sensor from reaching a sensing magnet in order to prevent contamination by ferrous particles.

The above and other objects are achieved in accordance with the present invention by utilizing a longitudinal float tube inside a mounting tube. The float tube is mounted in the mounting tube with suspension springs connecting each end of the float to respective ends of the mounting tube. The springs are relatively stiff in the radial direction but relatively flexible in the longitudinal direction of the mounting tube. This permits the float to move in the longitudinal direction of the tube quite easily while positioning the float to be adjacent to but not in contact with the walls of the mounting tube.

A magnet is mounted in the upper portion of the float and an electrical indication of the relative position of the magnet with respect to the mounting tube is provided by a Hall effect device located in the top of the tube. When the fluid level is below the float completely, the springs support the float entirely and provide the low level reading by way of the Hall effect device As fluid fills the tube as the fluid level increases, the greater percentage of the weight of the float is carried by the fluid allowing the spring to deflect upward towards its neutral position. When the fluid level sensor is half full, the buoyant force carries all of the float's weight and the springs are in a neutral position and the magnet is halfway to the top or full position. As more fluid enters into the fluid sensor, the float provides a buoyancy greater than its own weight and thus deflects the springs upwardly until a maximum deflection is reached when the full fluid level is reached.

In a preferred embodiment, the springs are comprised of inner and outer ring portions with three spiral arms interconnecting the inner and outer rings. The inner and outer rings are utilized to mount the spring on a non-magnetic float and a non-magnetic mounting tube respectively.

In a further preferred embodiment, magnets are mounted on both ends of the float and Hall effect devices are located on both end of the mounting tube. The outputs are provided to a differential amplifier whose output is linear in nature.

These and further objects and advantages of the present invention will become more apparent upon reference to the following specification, appended claims and drawings.

BRIEF DESCRIPTION OF THE DRAWINGS

FIG. 1 is a sectional view of the fluid level sensor in accordance with the present invention;

FIG. 2 is a plan view of one of the suspension springs in accordance with the present invention;

FIG. 3 is a side sectional view of the spring of FIG. 2 along sectional lines III—III;

FIG. 4 is an electrical schematic drawing of the present invention;

FIGS. 5A, 5B and 5C are block diagrams showing the operation of the fluid level sensor;

FIG. 6 is a graph showing the electrical output of the circuit of FIG. 4 when connected to the fluid level sensor of the present invention; and FIG. 7 is a block diagram showing a pair of magnets and Hall effect devices operating in a conjunction with a differential amplifier to provide a linear output.

DETAILED DESCRIPTION OF THE DRAWINGS

FIG. 1 is a side cross sectional view of the entire fluid level sensing device and will now be discussed in detail. A mounting tube 10 in a preferred embodiment is cylindrical and made of suitable non-magnetic material in order to be resistant to the fluid in which the sensor is to be used. The sensor float 12, having a positive buoyancy (it weighs less than the corresponding volume of fluid that it displaces), is made of a similar non-magnetic material and has a magnet 14 mounted at one end thereof. At an upper end of the mounting tube 10, there is an internally threaded portion into which is mounted threaded support 18 on which Hall effect device 20 is located. The Hall effect device 20 in combination with magnet 14 comprises a proximity detection means for providing an electrical output indicative of fluid level over the fluid level sensing range.

Float 12 is positioned for movement between a first (lower) position and a second (upper) position by a spring suspension means, in this case upper and lower springs 22 and 24, respectively. The springs could be any spring structure which permits the float to move longitudinally in the mounting tube but resists movement of the float in a lateral or radial direction. Thus, the spring suspension system serves to locate the float within the mounting tube but prevents contact between the float and the mounting tube which could degrade sensor operation and cause stiction and/or hysteresis.

In a preferred embodiment, the spring comprises a thin beryllium copper alloy layer which is 0.005 inches thick (in the longitudinal direction of the float) and is 0.045 inches wide (in the radial direction of the cylindrical mounting tube). The preferred embodiment of the springs can be seen in FIGS. 2 and 3 which depict spring 22 as being representative of both springs used, in the spring suspension system. The preferred embodiment of the springs include an inner ring portion 26, an outer ring portion 28 and spiral connecting arms 30. In FIG. 3 it can be seen that the springs have a greater dimension in the radial direction than they do in the longitudinal direction as noted above, giving them a much greater stiffness in the lateral direction than they have in the axial or longitudinal direction.

In a preferred embodiment of the fluid level sensor, the mounting tube has upper and lower spring mounting recesses 32 and 34 located at respective upper and lower end portions of the tube. The outer ring portion of each of the upper and lower springs are located in the respective upper and lower spring mounting recesses 32 and 34. The upper spring is maintained in place in its mounting recess by means of collar 36 which compresses the outer ring portion between itself and the mounting tube recess. Collar 36 may be maintained in place by gluing, ultrasonic welding or any other suitable means. The lower spring 24 is maintained in position in the lower spring mounting recess 34 by means of bottom cover 38 which may also be fixed in position by gluing, ultrasonic welding, etc.

The sensor float 12 has, at upper and lower portions thereof, upper and lower float mounting recesses 33 and 35, respectively, in which the upper and lower spring inner ring portions 26 are located. The inner ring portions are maintained in place by upper and lower float collars 37 and 39 which can also be glued, ultrasonically welded, or otherwise fixed in place.

The bottom cover 38 also has a number of apertures 40 therein which are sized so as to prevent entry of foreign particles large enough to disturb movement of the float 12 within the mounting tube 10. An upper slot 42 or plurality of slots may be provided in an upper portion of the mounting tube to permit the escape of air when fluid enters apertures 40. In a preferred embodiment, the upper slot has a long slender shape parallel with the longitudinal axis of the tube in order to prohibit the entry of large foreign particles and also prevents fluid droplets from blocking air entry or exit. The vertical slot causes a droplet thereon to pool at the bottom of the slot and burst at the top of the slot allowing the desired venting function.

The Hall effect device 20 mounted on the threaded support 18 in the fluid level sensor is shown in an electrical schematic in FIG. 4. Resistors 44 and 46 may be varied in order to compensate for null variations and can be used to set the zero point of the sensor. Resistor 48 can be varied to compensate for the transducer scale factor changing the output variation with changing fluid levels in the device.

The operation of the fluid level sensor may be better understood by reference to FIGS. 5A through 5C which comprise a block diagram schematically illustrating the three most significant conditions of the fuel level sensor. In FIG. 5A an empty fluid level is indicated because the float's weight is not carried by the fluid, the entire weight of the float is carried by springs 22 and 24 causing the float 12 to sag to its lowest mounted position, i.e. a first position.

FIG. 5B illustrates the condition in the fluid level sensor when the fluid has reached approximately the one-half full position 52 in which the float's weight is completely carried by the buoyancy of the float in the fluid and in which the springs 22 and 24 are not deflected upwards or downwards.

FIG. 5C illustrates when the fluid 54 is at the full level and the float is completely submerged producing its maximum buoyancy which is in excess of the weight of the float This excess buoyancy causes the springs 22 and 24 to be deflected upwards as shown to its highest mounted position, i.e. a second position. It can be seen that by reference to FIGS. 5A and 5C that the range of fluid level sensor (shown by the double ended arrow A) is equal to the length of the float in the fluid level direction plus the amount of deflection of the springs 22 and 24 from the empty to the full position (shown by the double ended arrow B). It can be seen then that while the fluid level varies from the empty position 50 to the full position 54, a distance equal to A as shown, the float moves only a distance B between its first and second positions. Thus, the movement of magnet 14 with respect to Hall effect device 20 is limited to a relatively small range over which accurate measurements can be made while rather substantial fluid level measurements can be made.

It can be seen by referring back to FIG. 1 that the threaded support 18 can be screwed into or out of the mounting tube to adjust the initial position of the Hall effect device. Initial adjustment of the device can also be facilitated without the need for calibrating in fluid by the particular construction of FIG. 1. For example, the device can be calibrated in the "empty" position in its normal orientation as set forth in FIG. 1.

If the device is constructed so that the float has a buoyancy equal to its weight when the fluid level is at the "half full" position on the float (the condition of FIG. 5B), the "half full" position can be calibrated by laying the fuel level sensor on its side so that the weight of float 12, without fluid present, does not deflect springs 22 and 24 downward as it would in FIG. 5A.

Similarly, the "full" condition can be calibrated by turning the float upside down and allowing the weight of the float to deflect springs 22 and 24 so as to decrease the distance between the magnet 14 and the Hall effect device 20 to the second or "full" position. If the excess buoyancy (over and above the weight of the float) of the float when completely submerged is equal to the weight of the float (out of the fluid) then with the level sensor upside down the distance between the magnet 14 and Hall effect device 20 would be the same as that distance when the fuel level is at the full position as shown in FIG. 5C.

Thus, the sensitivity, null position and scale factors can all be adjusted without the need for using a calibration fluid. Once the position of the Hall effect device is fixed, the threaded support 18 can be ultrasonically welded in place and a potting material 56 may be used to seal the end of the assembly and to provide support for the output cable 58.

In the preferred embodiment, as noted, the springs are made of beryllium copper alloy 0.005 inches thick and 0.045 inches wide by a conventional photoetching process. A Hall effect device available from Honeywell Electronics entitled "Micro-Switch SS94A1-XX" was used with the magnet 14 being located approximately 0.185 inches from the Hall effect device 20 under the maximum separation distance conditions of FIG. 5A. The springs 22 and 24 under the weight of the float deflected from their neutral position approximately 0.070 inches downward, and under their fully submerged condition as shown in FIG. 5C, deflected approximately 0.070 inches upward. The float assembly itself was approximately 3.5 inches long and accordingly the measuring distance A of the fluid level sensor was 3.640 inches and the maximum travel of the float was 0.140 inches.

FIG. 6 provides an indication of the voltage output received from the output terminal of FIG. 4 with a fluid depth varying from 0 to 3 inches.

It can be seen in FIG. 6 that the output of the sensor circuit in FIG. 4 is non-linear in nature. Because in many instances a linear output is desirable, FIG. 7 illustrates an embodiment which will meet such need. The fluid level sensor is as previously discussed except that the bottom of the mounting tube 10 has an additional Hall effect device 20' and the bottom of the float 12 has a magnet 14'. The outputs (as shown in FIG. 4) of the Hall effect devices 20 and 20' are provided to differential amplifier 60. During operation, as the float moves in one direction, its magnets will move towards one Hall effect device and away from the other. The "push-pull" operation of the Hall effect devices' outputs are supplied as inputs to the differential amplifier 60 which produces a difference output which is a linear indication of the position of the float position and thus fluid level.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fluid level sensor for providing an electrical output indicative of the level of a fluid over a fluid level sensing range, said sensor comprising:
   float means for providing positive buoyancy in said fluid;
   spring suspension means for positioning said float means for non-sliding movement between first and second positions where the distance between said first and second positions is less than said fluid level sensing range; and
   non-sliding proximity detection means, responsive to the position of said float means between said first and second positions, for providing an electrical output indicative of fluid level over said fluid level sensing range.

2. A fluid level sensor in accordance with claim 1, said fluid level varying in a fluid level sensing direction, wherein said float means comprises a float having a length in said fluid level sensing direction similar to said fluid level sensing range.

3. A fluid level sensor in accordance with claim 2, wherein said float length is equal to said fluid level sensing range minus a distance equal to the distance between said first and second positions.

4. A fluid level sensor in accordance with claim 1, wherein said sensor includes a mounting tube, and said spring suspension means comprises:
   an upper spring, mounted between an upper portion of said float means and an upper portion of said mounting tube; and
   a lower spring, mounted between a lower portion of said float means and a lower portion of said mounting tube.

5. A fluid level sensor in accordance with claim 1, wherein said proximity detection means comprises:
   a Hall effect device;
   a magnet mounted on said float means; and
   electronic circuit means for powering said Hall effect device and for providing an output therefrom indicative of the position of said magnet relative to said Hall effect device.

6. A fluid level sensor in accordance with claim 1, wherein said proximity detection means comprises:
   a first Hall effect device located above said float means;
   a second Hall effect device located below said float means;
   a first magnet mounted on an upper portion of said float means;
   a second magnet mounted on a lower portion of said float means;
   electronic circuit means for powering said Hall effect devices and for providing first and second outputs therefrom, indicative of the position of said respective first and second magnets relative to said respective first and second Hall effect devices; and differential amplifier means, responsive to said first and second outputs from said electronic circuit means, for providing a linear output indicative of the position of said float means.

7. A fluid level sensor for providing an electrical output indicative of the level of a fluid over a fluid level sensing range, said sensor comprising:

float means for providing positive buoyancy in said fluid;

spring suspension means for positioning said float means for movement between first and second positions where the distance between said first and second positions is less than said fluid level sensing range; and proximity detection means, responsive to the position of said float means between said first and second positions, for providing an electrical output indicative of fluid level over said fluid level sensing range, said fluid level varying in a fluid level sensing direction, wherein said float means comprises a float having a length in said fluid level sensing direction similar to said fluid level sensing range, wherein said float length is equal to said fluid level sensing range minus a distance equal to the distance between said first and second positions, wherein said sensor includes a mounting tube, and said spring suspension means comprises:

an upper spring, mounted between an upper portion of said float means and an upper portion of said mounting tube; and a lower spring, mounted between a lower portion of said float means and a lower portion of said mounting tube, wherein each of said springs comprise:

an inner ring portion;

an outer ring portion; and at least one connecting arm.

8. A fluid level sensor in accordance with claim 7, wherein each of said springs have three spiral connecting arms.

9. A fluid level sensor in accordance with claim 8, wherein said spiral connecting arms have a thickness in the direction of movement between said first position and said second position and have a width in a radial direction from said inner ring portion to said outer ring portion, said width is greater than said thickness.

10. A fluid level sensor in accordance with claim 9, wherein said spiral connecting arms thickness is less than 20% of said spiral connecting arms width.

11. A fluid level sensor for providing an electrical output indicative of the level of a fluid over a fluid level sensing range, said fluid level varying in a fluid level sensing direction, said sensor comprising:

a mounting tube;

float means for providing positive buoyancy in said fluid, said float means comprises a float having a length in said fluid level sensing direction similar to said fluid level sensing range;

spring suspension means for positioning said float within said mounting tube for movement between first and second positions where the distance between said first and second positions is less than said fluid level sensing range; and proximity detection means, responsive to the position of said float between said first and second positions, for providing an electrical output indicative of fluid level over said fluid level sensing range, wherein said mounting tube includes upper and lower spring mounting recesses, said float includes upper and lower float mounting recesses, and said spring suspension means comprises:

an upper spring, mounted between an upper portion of said float and an upper portion of said mounting tube;

a lower spring, mounted between a lower portion of said float and a lower portion of said mounting tube; and wherein each of said upper and lower springs comprise: an inner ring portion; an outer ring portion; and at least one connecting arm.

12. A fluid level sensor in accordance with claim 11, wherein said upper and lower spring inner ring portions are located in said upper and lower float mounting recesses, respectively, said upper and lower spring outer ring portions are located in said upper and lower spring mounting recesses, respectively, and each of said upper and lower spring at least one connecting arm has a thickness in the direction of movement between said first position and said second position and has a width in a radial direction from said inner ring portion to said outer ring portion, where said width is greater than said thickness.

13. A fluid level sensor in accordance with claim 12, wherein said proximity detection means comprises:

a Hall effect device mounted on said mounting tube;

a magnet mounted on said float means; and electronic circuit means for powering said Hall effect device and for providing an output therefrom indicative of the position of said magnet relative to said Hall effect device.

14. A fluid level sensor in accordance with claim 12, wherein said proximity detection means comprises:

a first Hall effect device located on an upper portion of said mounting tube above said float;

a second Hall effect device located on a lower portion of said mounting tube below said float;

a first magnet mounted on an upper portion of said float;

a second magnet mounted on a lower portion of said float;

electronic circuit means for powering said Hall effect devices and for providing first and second outputs therefrom, indicative of the position of said respective first and second magnets relative to said respective first and second Hall effect devices; and differential amplifier means, responsive to said first and second outputs from said electronic circuit means, for providing a linear output indicative of the position of said float means.

15. A fluid level sensor for providing an electrical output indicative of the level of a fluid over a fluid level sensing range, said fluid level varying in a fluid level sensing direction, said sensor comprising:

a mounting tube;

float means for providing positive buoyancy in said fluid, said float means comprises a float having a length in said fluid level sensing direction similar to said fluid level sensing range;

spring suspension means for positioning said float within said mounting tube for non-sliding movement between first and second positions where the distance between said first and second positions is less than said fluid level sensing range; and non-contacting proximity detection means, responsive to the position of said float between said first and second positions, for providing an electrical output indicative of fluid level over said fluid level sensing range.

16. A fluid level sensor for providing an electrical output indicative of the level of a fluid over a fluid level sensing range, said fluid level varying in a fluid level sensing direction, said sensor comprising:
   a cylindrical mounting tube having upper and lower mounting recesses;
   a cylindrical float, located within said mounting tube, for providing positive buoyancy in said fluid, said float having a length in said fluid level sensing direction similar to said fluid level sensing range, said float having upper and lower float mounting recesses;
   spring suspension means for positioning said float means within said mounting tube for movement between first and second positions where the distance between said first and second positions is less than said fluid level sensing range, said spring suspension means comprising:
      an upper spring and a lower spring, wherein each of said upper and lower springs comprise: an inner ring portion; an outer ring portion; and at least one connecting arm, wherein said upper and lower spring inner ring portions are located in said upper and lower float mounting recesses, respectively, said upper and lower spring outer ring portions are located in said upper and lower spring mounting recesses, respectively, said at least one connecting arm has a thickness in the direction of movement between said first position and said second position and has a width in a radial direction from said inner ring portion to said outer ring portion, where said width is greater than said thickness; and
   proximity detection means, responsive to the position of said float means between said first and second positions, for providing an electrical output indicative of fluid level over said fluid level sensing range, said proximity detection means comprises:
      a Hall effect device mounted on said mounting tube;
      a magnet mounted on said float; and
      electronic circuit means for powering said Hall effect device and for providing an output therefrom indicative of the position of said magnet relative to said Hall effect device.

17. A fluid level sensor for providing an electrical output indicative of the level of a fluid over a fluid level sensing range, said fluid level varying in a fluid level sensing direction, said sensor comprising:
   a cylindrical mounting tube having upper and lower mounting recesses;
   a cylindrical float, located within said mounting tube, for providing positive buoyancy in said fluid, said float having a length in said fluid level sensing direction similar to said fluid level sensing range, said float having upper and lower float mounting recesses;
   spring suspension means for positioning said float means within said mounting tube for movement between first and second positions where the distance between said first and second positions is less than said fluid level sensing range, said spring suspension means comprising:
      an upper spring and a lower spring, wherein each of said upper and lower springs comprise: an inner ring portion; an outer ring portion; and at least one connecting arm, wherein said upper and lower spring inner ring portions are located in said upper and lower float mounting recesses, respectively, said upper and lower spring outer ring portions are located in said upper and lower spring mounting recesses, respectively, said at least one connecting arm has a thickness in the direction of movement between said first position and said second position and has a width in a radial direction from said inner ring portion to said outer ring portion, where said width is greater than said thickness; and
   proximity detection means, responsive to the position of said float means between said first and second positions, for providing an electrical output indicative of fluid level over said fluid level sensing range, said proximity detection means comprises:
      a first Hall effect device located on an upper portion of said mounting tube above said float;
      a second Hall effect device located on a lower portion of said mounting tube below said float;
      a first magnet mounted on an upper portion of said float;
      a second magnet mounted on a lower portion of said float;
      electronic circuit means for powering said Hall effect devices and for providing first and second outputs therefrom, indicative of the position of said respective first and second magnets relative to said respective first and second Hall effect devices; and
      differential amplifier means, responsive to said first and second outputs from said electronic circuit means, for providing a linear output indicative of the position of said float means.

* * * * *